United States Patent [19]
Orzel

[11] 3,889,398
[45] June 17, 1975

[54] COLOR CODED WOOD CARVING STOCK AND METHOD

[76] Inventor: Stanley P. Orzel, 3320 Birney Ave., Scranton, Pa. 18503

[22] Filed: Dec. 19, 1973

[21] Appl. No.: 426,132

[52] U.S. Cl. ................................................. 35/26
[51] Int. Cl.² ......................................... G09B 19/00
[58] Field of Search .................................. 35/26, 41

[56] References Cited
UNITED STATES PATENTS
1,701,152   2/1929   Freedman ........................ 35/26 X
2,747,298   5/1956   Sullivan .............................. 35/26

OTHER PUBLICATIONS
Exercises in Woodworking, Ivin Sickles, 1890, pp. 66, 67.
Manual Training, J. M. Tate, 1908, pp. 34, 35.
"Boys' Useful Pastimes," Robert Griffith, 1885, pp. 324, 325, 326.
"Sunny Origami Swan Book," by Keinichi Fukuda, copyright 1967, Library of Congress No. 66-25568, page describing jumping and sitting frogs only.

*Primary Examiner*—Harland S. Skogquist
*Attorney, Agent, or Firm*—Jacob Shuster

[57] ABSTRACT

An elongated stock of solid wood is color coded to guide carving of a link chain. The wood stock is cross-shaped in cross-section presenting 12 surfaces on which various areas are marked by dies of different colors to define volumes to be removed from the stock by a cutting tool or wood carving knife. Upon removal of the color coded volumes, rough chain links readily separated from each other, are formed.

3 Claims, 6 Drawing Figures

COLOR CODED WOOD CARVING STOCK AND METHOD

This invention relates to the training of students for the acquisition of wood carving skills and more particularly to the carving of articles such as link chains from solid stock material.

The preparation of elongated solid wood stock as an educational aid in teaching students wood carving skills, has already been proposed in U.S. Pat. No. 3,339,294 to Bynes. A rather complex arrangement of slots and scoring marks are formed in cross-sectionally rectangular stock, prior to presentation to the student, in accordance with the foregoing patent. Such an arrangement is not only difficult for young students to follow, but is also quite costly to prepare because of the numerous slots and scorings involved. It is therefore an important object of the present invention to provide a novel and more simple method of instruction for carving articles, such as link chains, from an elongated wood stock that is prepared in a less costly and more efficient manner.

In accordance with the present invention, solid wood stock of cross-shaped cross-section is prepared by color coding discrete surface portions thereof to define volumetric sections of wood to be removed from the stock as well as to signify the direction in which a carving knife blade is to pierce the wood for removal of the desired sections. The different color coded markings on the planar surfaces of the wood stock is furthermore arranged to minimize the amount of material that need be removed to substantially form and then separate the integral links of the chain.

The foregoing and other objects and advantages of the invention will be apparent from the following description and the accompanying drawing in which.

Figure 2:
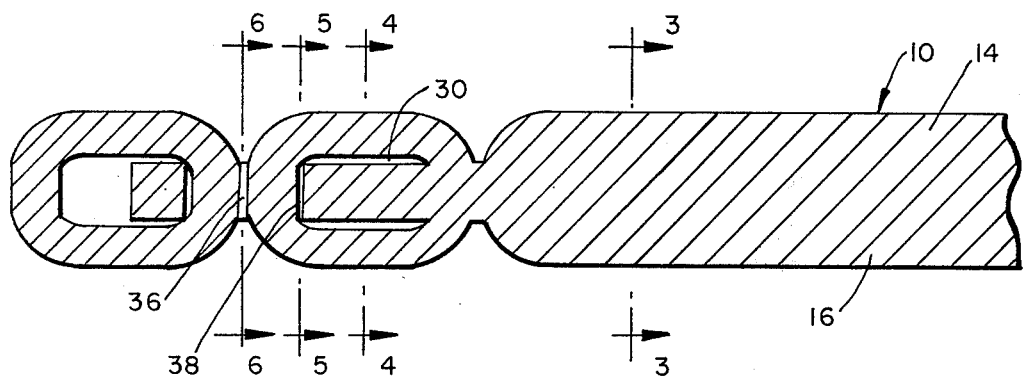
FIG. 2 is a longitudinal section view taken substantially through a plane indicated by section line 2—2 in FIG. 1.
Figure 4:
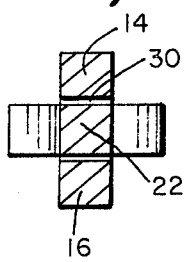

FIGS. 3, 4, 5 and 6 are transverse section views taken substantially through planes indicated by section lines 3—3, 4—4, 5—5 and 6—6 in FIG. 2.

Figure 1:
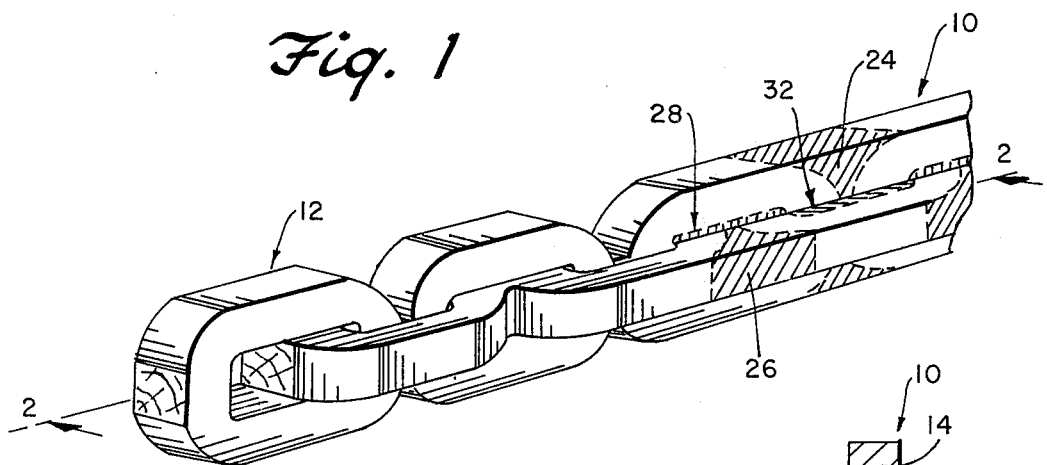
FIG. 1 is a perspective view of a partially carved link chain in various stages of formation from elongated stock material.
Figure 3:
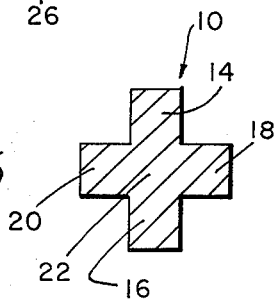

Referring now to the drawing in detail, FIG. 1 illustrates an elongated stock of solid wood or the like, generally referred to by reference numeral 10, from which a link chain has been partially carved including a fully formed end link 12. The solid stock 10 as more clearly seen in FIG. 3, is cross-shaped in cross-section and hence includes upper and lower legs 14 and 16 and laterally extending horizontal legs 18 and 20. Each of the four legs is defined by three surfaces for a total of twelve planar surfaces. These surfaces are aligned parallel to the two perpendicular planes that extend longitudinally through the stock 10 intersecting at its longitudinal axis within the central portion 22.

A group of geometrically similar wedge-shaped sections 24 are marked on the vertical legs 14 and 16 of the stock by a die, ink or pigment or any suitable equivalent thereof. The sections 24 are furthermore marked by the same color, such as black, and are equally spaced from each other longitudinally along the vertical cal plane on opposite sides of the transverse horizontal plane. The sections 24 on the vertical legs 14 and 16 are also aligned with each other, diverging radially outwardly from the central portion 22 of the stock. Similar wedge-shaped sections 26 marked by the same color as sections 24 on the horizontal legs 18 and 20, are also aligned with each other in staggered relation to the sections 24. It will be apparent from FIG. 1, that upon removal of the sections 24 and 26, the links will be partially formed at right angles to each other.

While the sections 24 and 26 are volumetrically defined by surface markings of the same color on all planar surfaces of the stock, parallel spaced pairs of horizontal lines 28 are marked on opposite sides of the legs 14 and 16 adjacent the central portion of the stock as shown in FIG. 1, to define thin sections that extend internally through the stock between only two of the surfaces of the legs. Upon removal of these thin horizontal sections of the stock, parallel spaced slots 30 are formed as more clearly seen in FIGS. 2 and 4. The lines 28 are of the same length and color such as red, and are longitudinally spaced along the vertical plane extending through the axis of the stock.

Another set of parallel spaced lines 32 as shown in FIG. 1 are marked by a different color, such as blue, on both sides of legs 18 and 20 adjacent the central portion 22. The lines 32 are substantially the same length as lines 28 and bridge the ends of lines 28 as shown. Upon removal of thin vertical sections from the stock between the lines 32, parallel spaced slots 34 are formed in the legs 18 and 20 as more clearly seen in FIGS. 5 and 6. While the color coding of the lines 32 direct piercing of the stock in vertical planes for removal of the thin sections to form slots 34, the color coding of lines 28 direct piercing of the stock in horizontal planes to form the slots 30.

It will also be apparent from FIG. 1 that the wedge sections 24 converge toward locations centrally between the ends of lines 32 while the wedge sections 26 converge toward locations intermediate the ends of lines 28. Accordingly, the links partially formed upon removal of sections 24 and 26 remain interconnected at the central portion 22 of the stock as more clearly seen in FIG. 4 until separated by slicing out the central portion to form a gap 36 as more clearly seen in FIGS. 2 and 6. Formation of the gaps 36 thus interconnect the slots 30 and 34 intermediate the ends thereof where the partially formed links were previously interconnected.

Figure 5:
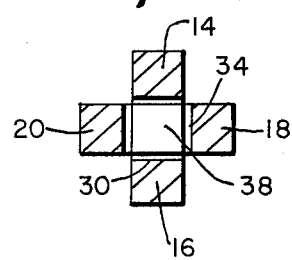
Figure 6:
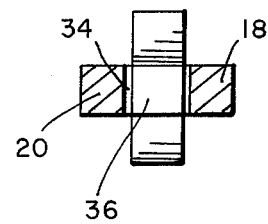

The links also remain interconnected between the slots 30 and 34 at the ends thereof and must be separated at locations 38 as more clearly seen in FIGS. 2 and 5, by slicing the central portion of the stock between the slots 30 and 34. The point of the carving blade is used for this purpose.

The links after being fully formed and separated as hereinbefore described, may be further carved to any desired final configuration by rounding edges and corners and to provide clearance for more freedom of relative movement between the links.

It is to be understood that changes and modifications of the invention as described may be made without departing from the spirit of the invention or the scope of the following claims.

I claim:

1. For use in teaching the carving of a chain formed by integral links from solid material, an elongated stock of predetermined cross-section perpendicular to a longitudinal axis having a plurality of external planar surfaces parallel to said axis and means for guiding removal of material from said stock to substantially form said chain, comprising markings on said planar surfaces of the stock defining two different groups of volumetric sections longitudinally spaced along the stock, said markings being color coded to render the two groups of volumetric sections visually distinguishable from each other, one of said groups of volumetric sections being completely defined substantially by the markings on all of said planar surfaces, the other of the groups of volumetric sections extending internally through the stock between markings on less than all of said planar surfaces and when removed from the stock forming pairs of parallel slots in the stock aligned with planes transverse to each other, said integral links of the chain being disposed parallel to said transverse planes.

2. The combination of claim 1 wherein the markings defining said one of the groups of volumetric sections are of the same color, while the markings defining the other of the groups of volumetric sections are of two different colors.

3. The combination of claim 1 wherein the slots aligned parallel to one of said transverse planes bridges the slots aligned parallel to the other of the transverse planes, said other of the groups of volumetric sections being wedgeshaped and aligned on opposite sides of said planes to form links interconnected with each other between each of said pairs of slots.

* * * * *